(12) United States Patent
Rahardjo et al.

(10) Patent No.: US 10,148,444 B2
(45) Date of Patent: Dec. 4, 2018

(54) SYSTEMS AND METHODS FOR STORING ADMINISTRATOR SECRETS IN MANAGEMENT CONTROLLER-OWNED CRYPTOPROCESSOR

(71) Applicant: Dell Products L.P., Round Rock, TX (US)

(72) Inventors: Johan Rahardjo, Austin, TX (US); Mukund P. Khatri, Austin, TX (US); Theodore S. Webb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 15/228,602

(22) Filed: Aug. 4, 2016

(65) Prior Publication Data

US 2018/0041344 A1 Feb. 8, 2018

(51) Int. Cl.
*H04L 9/32* (2006.01)
*H04L 9/08* (2006.01)

(52) U.S. Cl.
CPC .......... *H04L 9/3263* (2013.01); *H04L 9/0897* (2013.01); *H04L 9/3234* (2013.01)

(58) Field of Classification Search
None
See application file for complete search history.

(56) References Cited

U.S. PATENT DOCUMENTS

| | | | |
|---|---|---|---|
| 8,572,410 B1 * | 10/2013 | Tkacik | H04L 9/0861 380/44 |
| 9,785,801 B2 * | 10/2017 | Zimmer | G06F 21/72 |
| 2004/0039924 A1 | 2/2004 | Baldwin et al. | |
| 2008/0148041 A1 * | 6/2008 | Carlson | G06F 21/6218 713/151 |
| 2009/0077638 A1 | 3/2009 | Norman et al. | |
| 2009/0327741 A1 * | 12/2009 | Zimmer | G06F 21/575 713/183 |
| 2011/0083003 A1 | 4/2011 | Jaber et al. | |

(Continued)

FOREIGN PATENT DOCUMENTS

WO WO 2015/200581 A1 * 12/2015 ............. G06F 21/57

OTHER PUBLICATIONS

International Search Report and Written Opinion, International Application No. PCT/US2017/044163, dated Oct. 6, 2017.

*Primary Examiner* — Christopher A Revak
(74) *Attorney, Agent, or Firm* — Jackson Walker L.L.P.

(57) ABSTRACT

A method may include storing a first set of secrets associated with an information handling system in a credential vault of a management controller configured to be coupled to a processor of a host system of the information handling system in order to provide management of the information handling system via management traffic communicated between the management controller and an external management network such that the first set of secrets are accessible responsive to a verified boot of the management controller and storing a second set of secrets associated with the information handling system in a storage of a cryptoprocessor owned by the management controller such that access to the second set of secrets may be granted in response to an administrator's provision of authorization to the cryptoprocessor, and such that access to the second set of secrets is prevented during runtime of the host system in absence of authorization.

16 Claims, 2 Drawing Sheets

(56) References Cited

U.S. PATENT DOCUMENTS

| | | |
|---|---|---|
| 2015/0095631 A1 | 4/2015 | Rahardjo et al. |
| 2016/0048663 A1 | 2/2016 | Gillespie et al. |
| 2016/0081231 A1 | 3/2016 | Berke et al. |
| 2016/0127364 A1 | 5/2016 | Robison, Jr. et al. |
| 2016/0134621 A1* | 5/2016 | Palanigounder ...... H04W 12/06 713/156 |
| 2017/0061396 A1* | 3/2017 | Melika ................. G06Q 20/065 |
| 2017/0142191 A1* | 5/2017 | Caldwell ................ H04L 41/22 |
| 2017/0289153 A1* | 10/2017 | Raziel ................. H04L 63/0853 |
| 2017/0310656 A1* | 10/2017 | Caldwell ................. H04L 63/08 |
| 2018/0025183 A1* | 1/2018 | Zimmer ................ H04L 9/3234 |
| 2018/0045189 A1* | 2/2018 | Lee ........................ F04B 33/00 |

* cited by examiner

SYSTEMS AND METHODS FOR STORING ADMINISTRATOR SECRETS IN MANAGEMENT CONTROLLER-OWNED CRYPTOPROCESSOR

TECHNICAL FIELD

The present disclosure relates in general to information handling systems, and more particularly to methods and systems for enabling storage of administrator secrets in a management controller-owned cryptoprocessor.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Security of administrator credentials and certificates for out of band management of an information handling system has long been a concern. To overcome some of these concerns, management controllers for out of band management of information handling systems include a credential vault which is based on a hardware root of trust in the silicon of the management controller, thus ensuring a level of secure storage that is protected via a verified chain of trust during each boot of the information handling system. However, such approaches may have disadvantages. For example, such approaches may protect an information handling system from a boot time detection of compromise, but a compromise occurring during host system runtime may still be able to access secrets within the credential vault contents. In addition, secrets within the credential vault are not protected from compromise of a management controller or a physical access to the information handling system.

SUMMARY

In accordance with the teachings of the present disclosure, the disadvantages and problems associated with existing approaches for maintaining administrator secrets on an information handling system may be reduced or eliminated.

In accordance with embodiments of the present disclosure, an information handling system may include a host system comprising a host system processor, a management controller communicatively coupled to the host system processor and configured to provide management of the information handling system via management traffic communicated between the management controller and a dedicated management network external to the information handling system, and a cryptoprocessor communicatively coupled to and owned by the management controller processor. The management controller may include a management controller processor and a credential vault communicatively coupled to the management controller processor and configured to store a first set of secrets associated with the information handling system, wherein the first set of secrets are accessible in response to a hardware-verified boot of the management controller. The cryptoprocessor may comprise a storage configured to store a second set of secrets associated with the information handling system such that access to the second set of secrets may be granted in response to an administrator's provision of a verified authorization to the cryptoprocessor, and such that access to the second set of secrets is prevented during runtime of the host system if the verified authorization is not present.

In accordance with these and other embodiments of the present disclosure, a method may include communicatively coupling a credential vault to a management controller processor of a management controller configured to be coupled to a host system processor of a host system of an information handling system in order to provide management of the information handling system via management traffic communicated between the management controller and a dedicated management network external to the information handling system, wherein the credential vault is configured to store a first set of secrets associated with the information handling system, wherein the first set of secrets are accessible in response to a hardware-verified boot of the management controller. The method may also include communicatively coupling a cryptoprocessor to the management controller processor such that it is owned by the management controller processor, the cryptoprocessor comprising a storage configured to store a second set of secrets associated with the information handling system such that access to the second set of secrets may be granted in response to an administrator's provision of a verified authorization to the cryptoprocessor, and such that access to the second set of secrets is prevented during runtime of the host system if the verified authorization is not present.

In accordance with these and other embodiments of the present disclosure, a method may include storing a first set of secrets associated with an information handling system in a credential vault integral to a management controller configured to be coupled to a host system processor of a host system of an information handling system in order to provide management of the information handling system via management traffic communicated between the management controller and a dedicated management network external to the information handling system such that the first set of secrets are accessible in response to a hardware-verified boot of the management controller. The method may also include storing a second set of secrets associated with the information handling system in a storage of a cryptoprocessor communicatively coupled to and owned by the management processor such that access to the second set of secrets may be granted in response to an administrator's provision of a verified authorization to the cryptoprocessor, and such that access to the second set of secrets is prevented during runtime of the host system if the verified authorization is not present.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: (i) store a first set of secrets associated with an information handling system in a credential vault integral to a management controller configured to be coupled to a host system processor of a host system of an information handling system in order to provide management of the information handling system via management traffic communicated between the management controller and a dedicated management network external to the information handling system such that the first set of secrets are accessible in response to a hardware-verified boot of the management controller; and (ii) store a second set of secrets associated with the information handling system in a storage of a cryptoprocessor communicatively coupled to and owned by the management processor such that access to the second set of secrets may be granted in response to an administrator's provision of a verified authorization to the cryptoprocessor, and such that access to the second set of secrets is prevented during runtime of the host system if the verified authorization is not present.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
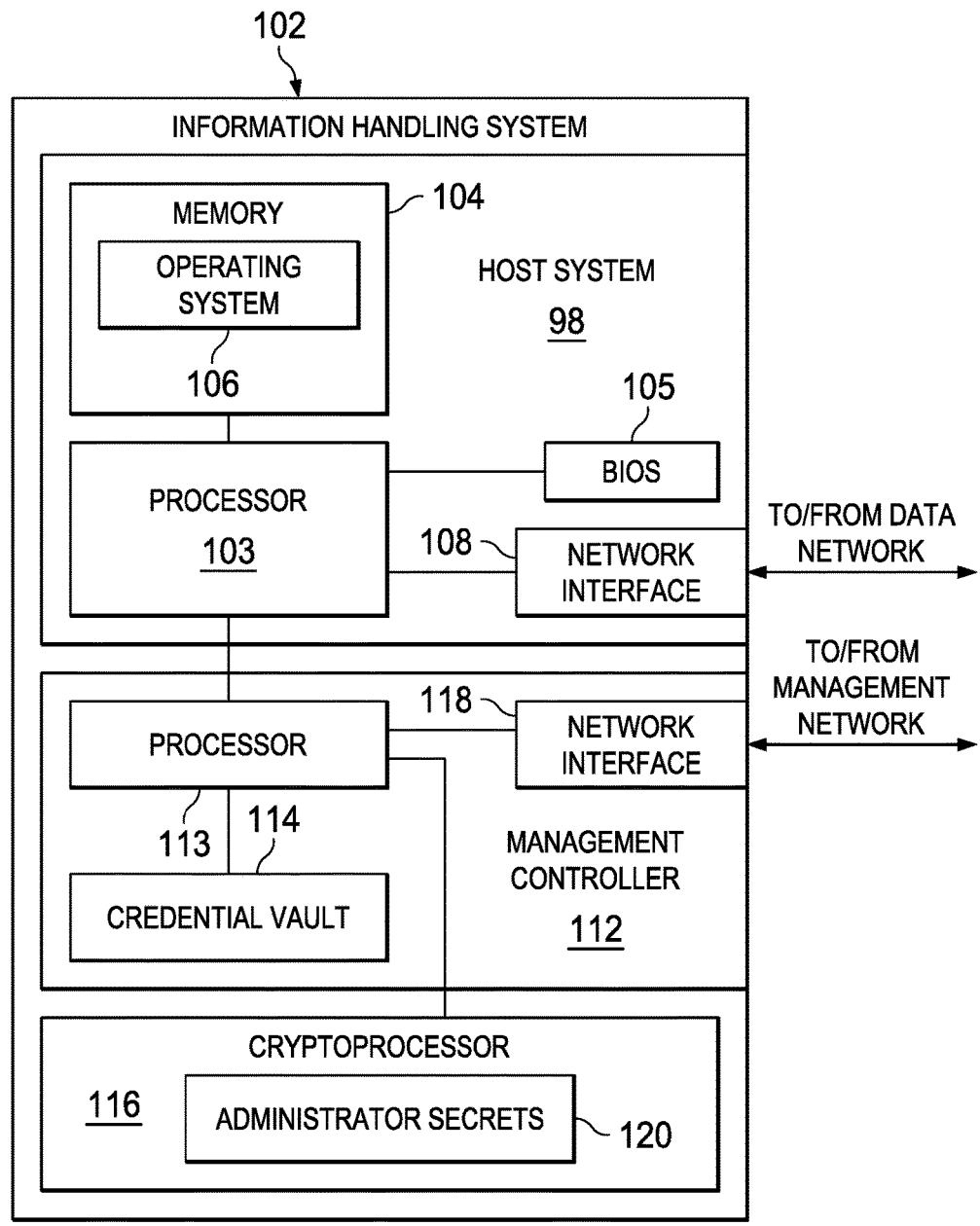
FIG. 1 illustrates a block diagram of an example information handling system, in accordance with embodiments of the present disclosure.
Figure 2:
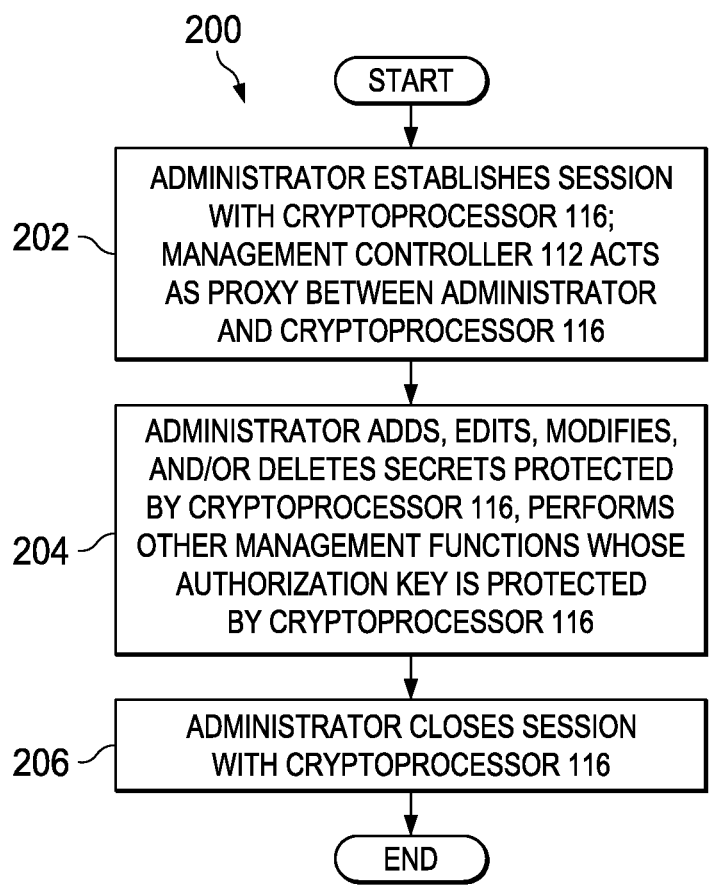
FIG. 2 illustrates a flowchart of an example method for storing administrator secrets in a management controller-owned cryptoprocessor, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, a management controller 112 communicatively coupled to processor 103, and a cryptoprocessor 116 communicatively coupled to a processor 113.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 is powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113, a credential vault 114 communicatively coupled to processor 113, and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Credential vault 114 may comprise a database or any other suitable data structure stored in computer-readable media integral to or otherwise accessible to processor 113, and may be used to store passwords and similar cryptographic key material. For example, data stored in credential vault 114 may comprise current and historical passwords to privileged accounts. In some embodiments, all passwords and keys may be encrypted, to protect against disclosure to an attacker who has compromised the physical storage media where credentials are stored or backed up. Access to contents of credential vault 114 is often subject to access controls, so that different (authenticated) users are able to fetch different sets of passwords or keys. Accordingly, credential vault 114 may only be accessible in connection with a hardware-verified boot.

Cryptoprocessor 116 may be communicatively coupled to processor 113 (e.g., via an I2C bus) and may include any system, device, or apparatus configured to carry out cryptographic operations on data communicated to it from processor 113 and/or another component of management controller 112. Thus, cryptoprocessor 116 may be dedicated to management controller 112. In some embodiments, cryptoprocessor 116 may be compliant with the Trusted Platform Module (TPM) specification, a successor specification, and/or any other similar specification. In some embodiments, cryptoprocessor 116 may be configured to generate random numbers, generate encryption keys (e.g., RSA keys), generate and maintain hash key tables of hardware and software components associated with management controller 112, generate and maintain configuration parameters associated with hardware and software components of management controller 112, wrap (e.g., encrypt) keys, unwrap (e.g., decrypt) keys and/or store keys (e.g., endorsement key, storage root key, attestation identity keys, storage keys).

In some embodiments, cryptoprocessor 116 may comprise a non-volatile memory accessible only to cryptoprocessor 116. As shown in FIG. 1, such non-volatile memory may store administrator secrets 120 independent of secrets stored in credential vault 114, as described in greater detail elsewhere in this disclosure.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

In addition to processor 103, memory 104, network interface 108, management controller 112, and cryptoprocessor 116, information handling system 102 may include one or more other information handling resources.

In operation, credential vault 114 may store user login credentials, certificates, and other critical items that may be required for operation of management controller 112 and manageability of information handling system 102. In addition, cryptoprocessor 116 may enable use of a storage key from the storage hierarchy of cryptoprocessor 116 to store secrets of an administrator of information handling system 102, independently of the secrets stored in credential vault 114. Accordingly, storing administrator secrets in cryptoprocessor 116 may enable granular access control of system management functions of information handling system 102, and may allow for secure storage of additional certificates for identity, access, additional administrator credentials, other keys, and/or other secrets for which an administrator may desire to secure with a higher level of security than that afforded by credential vault 114. In some embodiments, in lieu of storing such secrets in cryptoprocessor 116, such secrets may be encrypted or otherwise wrapped with the storage key and stored in such encrypted form in a memory accessible to cryptoprocessor 116 (e.g., an expansion memory).

During a provisioning process, an administrator may (e.g., accessing management controller 112 via network interface 118 using a management console, using a KVM device locally attached to information handling system 102, etc.) store specific administrator secrets in cryptoprocessor 116. After provisioning, the administrator may remove an authorization from cryptoprocessor 116. For example, in embodiments in which cryptoprocessor 116 comprises a TPM, such authorization removal may comprise removal of the TPM owner Auth from cryptoprocessor 116. Once such authorization is removed, normal inband and out of band management access for the administrator and all other authorized users may continue as enabled by credential vault 114, while extended access and additional system management functions enabled by administrator secrets 120 stored in cryptoprocessor 116 are not available. Administrator secrets 120 stored in cryptoprocessor 116 are thus no longer accessible, including being inaccessible to an operating system runtime compromise or on physical access of information handling system 102, or in a debug mode.

To re-enable access to administrator secrets 120 in cryptoprocessor 116 and hence re-enable access to extended system management functions, an administrator must provide the authorization to management controller 112, enabling access to cryptoprocessor 116 storage.

FIG. 2 illustrates a flowchart of an example method 200 for storing administrator secrets in a management controller-owned cryptoprocessor 116, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, an administrator may establish a session with cryptoprocessor 116, wherein management controller 112 acts as a proxy between the administrator and cryptoprocessor 116. For example, in embodiments in which cryptoprocessor 116 comprises a TPM, the administrator may establish a session with the TPM, and management controller 112 may act as a middleware layer between the administrator and the TPM. Notably, TPM may be designed such that a middleware layer need not necessarily be trusted in order to provide end-to-end security between the administrator and the TPM.

At step 204, the administrator may add, edit, modify, delete, or perform other actions with respect to secrets protected by cryptoprocessor 116 (e.g., TPM). The administrator may also perform other management functions whose authorization key is protected by cryptoprocessor 116 (e.g., TPM).

At step 206, the administrator may close the session with cryptoprocessor 116 (e.g., TPM). For example, to close the session, the administrator may remove the authorization from cryptoprocessor 116, thereby protecting its contents. After completion of step 206, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

Using the methods and systems described above, while credential vault 114 may store user login credentials, certificates, and other critical storage items that are required for operations of management controller 112 and system manageability, cryptoprocessor 116, which is owned by management processor 112 may enable use of a storage key from a storage hierarchy of cryptoprocessor 116 in order to store additional administrator secrets 120 independent of secrets stored in credential vault 114, and an administrator may utilize such functionality to store administrator secrets 120. Such storage of additional secrets may enable granular access control of system management functions, and may include additional certificates for identity, access, additional administrator credentials, other keys, and/or other secrets. In alternative embodiments, administrator secrets may be wrapped with the storage key and stored in an expansion memory accessible to cryptoprocessor 116.

In addition, after provisioning and storage of specific administrator secrets in the cryptoprocessor 116, the administrator may remove an authorization from cryptoprocessor 116. For example, in embodiments in which cryptoprocessor 116 comprises a TPM, such authorization removal may comprise removal of the TPM owner Auth from cryptoprocessor 116. After removal of such authorization, normal out-of-band and in-band management access for the administrator and all other authorized users continues as enabled by credential vault 114. However, extended access and additional system management functions enabled by administrator secrets are not available after the authorization is removed. Thus, contents stored in administrator secrets 120 are no longer accessible, whether on runtime compromise or on physical access of information handling system 102 or in a debug mode.

Furthermore, at a later time, to re-enable access to administrator secrets 120 in cryptoprocessor 116 and hence re-enable access to the extended system management functions enabled by administrator secrets 120, the administrator may provide (e.g., inject) the authorization (e.g., TPM Auth) to management controller 112, which then may re-enable access to storage of cryptoprocessor 116.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a host system comprising a host system processor;
   a management controller communicatively coupled to the host system processor and configured to provide out-of-band management of the information handling system via management traffic communicated between the management controller and a dedicated management network external to the information handling system, the management controller being capable of providing the out-of-band management when the information handling system is in a powered-off state, the management controller comprising:
   a management controller processor; and
   a credential vault communicatively coupled to the management controller processor and configured to store a first set of secrets associated with the information handling system, wherein the first set of secrets are accessible in response to a hardware-verified boot of the management controller; and
   a cryptoprocessor communicatively coupled to and owned by the management controller processor, the cryptoprocessor comprising a storage configured to store a second set of secrets associated with the information handling system such that access to the second set of secrets may be granted in response to an administrator's provision of a verified authorization to the cryptoprocessor, and such that access to the second set of secrets is prevented during runtime of the host system if the verified authorization is not present.

2. The information handling system of claim 1, wherein the cryptoprocessor comprises a Trusted Platform Module.

3. The information handling system of claim 1, wherein the management controller comprises a baseboard management controller.

4. The information handling system of claim 1, wherein the second set of secrets comprises credentials for performing particular management functions not enabled by the first set of secrets.

5. A method comprising:
   communicatively coupling a credential vault to a management controller processor of a management controller configured to be coupled to a host system processor of a host system of an information handling system in order to provide out-of-band management of the information handling system via management traffic communicated between the management controller and a dedicated management network external to the information handling system, the management controller being capable of providing the out-of-band management when the information handling system is in a powered-off state, wherein the credential vault is configured to store a first set of secrets associated with the information handling system, wherein the first set of secrets are accessible in response to a hardware-verified boot of the management controller; and
   communicatively coupling a cryptoprocessor to the management controller processor such that it is owned by the management controller processor, the cryptoprocessor comprising a storage configured to store a second set of secrets associated with the information handling system such that access to the second set of secrets may be granted in response to an administrator's provision of a verified authorization to the cryptoprocessor, and such that access to the second set of secrets is prevented during runtime of the host system if the verified authorization is not present.

6. The method of claim 5, wherein the cryptoprocessor comprises a Trusted Platform Module.

7. The method of claim 5, wherein the management controller comprises a baseboard management controller.

8. The method of claim 5, wherein the second set of secrets comprises credentials for performing particular management functions not enabled by the first set of secrets.

9. A method comprising:
   storing a first set of secrets associated with an information handling system in a credential vault integral to a management controller configured to be coupled to a host system processor of a host system of the information handling system in order to provide out-of-band management of the information handling system via management traffic communicated between the management controller and a dedicated management network external to the information handling system such that the first set of secrets are accessible in response to a hardware-verified boot of the management controller, the management controller being capable of providing the out-of-band management when the information handling system is in a powered-off state; and
   storing a second set of secrets associated with the information handling system in a storage of a cryptoprocessor communicatively coupled to and owned by the management controller such that access to the second set of secrets may be granted in response to an administrator's provision of a verified authorization to the cryptoprocessor, and such that access to the second set of secrets is prevented during runtime of the host system if the verified authorization is not present.

10. The method of claim 9, wherein the cryptoprocessor comprises a Trusted Platform Module.

11. The method of claim 9, wherein the management controller comprises a baseboard management controller.

12. The method of claim 9, wherein the second set of secrets comprises credentials for performing particular management functions not enabled by the first set of secrets.

13. An article of manufacture comprising:
a non-transitory computer-readable medium; and
computer-executable instructions carried on the computer-readable medium, the instructions readable by a processor, the instructions, when read and executed, for causing the processor to:
store a first set of secrets associated with an information handling system in a credential vault integral to a management controller configured to be coupled to a host system processor of a host system of an information handling system in order to provide out-of-band management of the information handling system via management traffic communicated between the management controller and a dedicated management network external to the information handling system such that the first set of secrets are accessible in response to a hardware-verified boot of the management controller, the management controller being capable of providing the out-of-band management when the information handling system is in a powered-off state; and
store a second set of secrets associated with the information handling system in a storage of a cryptoprocessor communicatively coupled to and owned by the management controller such that access to the second set of secrets may be granted in response to an administrator's provision of a verified authorization to the cryptoprocessor, and such that access to the second set of secrets is prevented during runtime of the host system if the verified authorization is not present.

14. The article of claim 13, wherein the cryptoprocessor comprises a Trusted Platform Module.

15. The article of claim 13, wherein the management controller comprises a baseboard management controller.

16. The article of claim 13, wherein the second set of secrets comprises credentials for performing particular management functions not enabled by the first set of secrets.

* * * * *